United States Patent [19]

Schmiegel

[11] Patent Number: 4,496,682

[45] Date of Patent: Jan. 29, 1985

[54] CURABLE FLUOROPOLYMER CONTAINING AROMATIC AMINE

[75] Inventor: Walter W. Schmiegel, Wilmington, Del.

[73] Assignee: E. I. Du Pont de Nemours and Company, Wilmington, Del.

[21] Appl. No.: 584,582

[22] Filed: Feb. 29, 1984

Related U.S. Application Data

[63] Continuation-in-part of Ser. No. 500,055, Jun. 1, 1983, abandoned.

[51] Int. Cl.$^3$ .............................................. C08L 27/16
[52] U.S. Cl. .................................... 524/545; 524/546; 525/326.3; 525/353; 525/340
[58] Field of Search ................................ 524/545, 546; 525/326.3, 353, 340

[56] References Cited

U.S. PATENT DOCUMENTS

| | | | |
|---|---|---|---|
| 2,793,200 | 5/1957 | West | 525/326.3 |
| 2,838,471 | 6/1958 | Peterson et al. | 524/255 |
| 3,655,727 | 4/1972 | Patel et al. | 525/340 |
| 3,712,877 | 1/1973 | Patel | 525/340 |
| 3,752,787 | 8/1973 | Brunnen | 525/340 |
| 3,876,654 | 4/1975 | Pattison | 525/340 |
| 3,933,732 | 1/1976 | Schmiegel | 525/353 |
| 4,287,320 | 9/1981 | Kolb | 525/353 |

FOREIGN PATENT DOCUMENTS 740441 12/1969 Belgium .
1305893 2/1973 United Kingdom .

Primary Examiner—Maurice J. Welsh

[57] ABSTRACT

A curable fluoropolymer composition containing a polyhydroxy aromatic compound press-cure crosslinking agent, and a postcure crosslinking agent selected from aromatic diamines, and bisamines having the formula

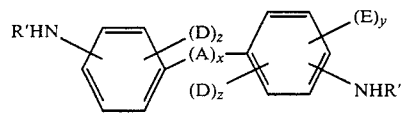

where A is a divalent radical and x is zero or 1, and the process of curing such a composition by partially curing in a confining zone, and then postcuring.

15 Claims, 1 Drawing Figure

CURABLE FLUOROPOLYMER CONTAINING AROMATIC AMINE

This application is a continuation-in-part of U.S. application Ser. No. 500,055 filed June 1, 1983, now abandoned.

This invention relates to a fluoropolymer composition that may be cured in two stages, and to the process of curing such fluoropolymer composition in stages.

BACKGROUND

Fluoropolymer compositions that may be cured in stages or steps are known in the art. U.S. Pat. No. 4,177,223 to Arhart et al. discloses a fluoropolymer composition containing a blocked crosslinking agent, i.e. one in which the hydroxyl groups are reacted to form acetal or thioacetal groups and participates in the vulcanization reaction primarily at high temperatures, and a crosslinking agent, that participate in the vulcanization reaction at lower temperatures. One difficulty with this prior art composition is that during the high temperature crosslinking reaction the blocking agent is released to the atmosphere as a pollutant.

Fluoroelastomer compositions containing more than one vulcanization component are known. U.S. Pat. No. 3,655,727 to Patel et al. shows (See Table K) fluoroelastomer compositions containing hydroquinone and aromatic diamines which compositions are cured by heating in a mold (press cured) and then in an air oven at a higher temperature (postcured).

The composition and process of the present invention is an improvement over the prior art, in that the curing of the compositions does not release a polluting blocking agent fragment, and in that the compositions contain a vulcanization component that is active under press cure conditions and another component that is appreciably active only under post cure conditions.

SUMMARY OF THE INVENTION

The composition of the present invention is a fluoroelastomer composition comprising an elastomeric copolymer of vinylidene fluoride and at least one other fluorinated monomer, a vulcanization accelerator selected from the class consisting of quaternary phosphonium and quaternary ammonium compounds, a metal compound selected from the group consisting of divalent metal oxides, divalent metal hydroxides, and mixtures of such oxides or hydroxides with metal salts of weak acids, a press cure crosslinking agent which is either a bisphenol, or an ammonium or phosphonium salt thereof or a polyhydroxy phenol, a post-cure crosslinking agent having the formula:

where A is a difunctional radical, and X is zero or 1.

The process of the present invention comprises heating the composition just described in a confining zone, e.g. a conventional rubber curing press, a mold, an extruder nozzle or the like, for a time and at a temperature such that the fluoroelastomer is partially cured. The amount of partial cure should be such that the elongation (press cured) at break for the partially cured fluoroelastomer is not greater than about 500% when measured at room temperature. The partially cured fluoroelastomer is then removed from the confining zone, and further cured at a higher temperature for a time such that the resulting fluoroelastomer has an elongation at break (post-cured) such that the value of the press cured elongation at break divided by the post-cured elongation at break is at least 1.5.

DETAILED DESCRIPTION

Among the vinylidene fluoride copolymers useful with this invention are copolymers with hexafluoropropylene, chlorotrifluoroethylene, 1-hydropentafluoropropylene, or 2-hydropentafluoropropylene and copolymers of vinylidene fluoride, tetrafluoroethylene and hexafluoropropylene or 1-hydro or 2-hydropentafluoropropylene. "Copolymer" herein means the product of copolymerizing two or more monomers. Especially preferred are vinylidene fluoride/hexafluoropropylene copolymers in which the monomers are combined in a molar ratio of about 88:12 to 50:50, and terpolymers of the type disclosed in 2,968,649 to Pailthorp et al. The fluoroelastomer can also be any other vinylidene fluoride copolymer which can be cured to useful products, for example copolymers of vinylidene fluoride and hexafluoropropylene or pentafluoropropylene or linear perfluoro alpha olefins with dichlorodifluoroethylene, chlorofluoroethylene, chlorotrifluoroethylene, bromotetrafluorobutene, (Polymers of this type are shown in Apotheker et al. U.S. Pat. No. 4,214,060), with fluorinated vinyl esters, with derivatives of perfluoroacrylic acid, and with fluorinated alkyl vinyl ethers; the latter can be illustrated by copolymers of vinylidene fluoride, hexafluoropropylene and a perfluoroalkyl perfluorovinyl ether.

Useful copolymers of vinylidene fluoride and 1,2,3,3,3-pentafluoropropylene are described in U.S. Pat. No. 3,331,823, and copolymers of these two components with tetrafluoroethylene are described in U.S. Pat. No. 3,335,106. The "other fluorinated monomer" of such an elastomeric copolymer is preferably an ethylenically unsaturated monomer containing at least as many fluorine atoms as carbon atoms.

An essential ingredient of the composition is the vulcanization accelerator.

Particularly preferred accelerators are benzyl triphenyl phosphonium chloride, -bromide, and -phenolates of 4,4'-hexafluoroisopropylidene diphenol, used either alone or blended with about 1–50 percent of another accelerator based on the total weight of accelerator. Other useful accelerators are illustrated as follows: methyl trioctyl phosphonium tetrafluoroborate, tetraphenyl phosphonium bromide and -chloride, benzyl trioctyl phosphonium bromide and -chloride, methyl trioctyl phosphonium acetate, methyl trioctyl phosphonium dimethyl phosphate, methyl trioctyl phosphonium chloride, methoxyethoxyethyl trioctyl phosphonium chloride, tetraoctyl phosphonium bromide, butyl trioctyl phosphonium bromide, 1-carbethoxyethyl triphenyl phosphonium chloride, tetrabutyl phosphonium chloride, 2,4-dichlorobenzyl triphenyl phosphonium chloride, m-trifluoromethylbenzyl trioctyl phosphonium chloride, 2,2,3,3-tetrafluoropropyl trioctyl phosphonium chloride, 2,2,3,3,4,4,5,5-octafluoropentyl trioctyl phosphonium chloride, isobutyl triphenyl phosphonium bromide, 2-pentyl triphenyl phosphonium bromide, 4-methylbenzyl triphenyl phos- phonium chloride, 4-chlorobenzyl triphenyl phosphonium chloride, diphenylmethyl triphenyl phosphonium chloride, m-trifluoromethylbenzyl triphenyl phosphonium chloride, 1-naphthylmethyl triphenyl phosphonium chloride, 2-cyanobenzyl triphenyl phosphonium bromide, 4 -cyanobutyl triphenyl phosphonium bromide, α-carbethoxybenzyl triphenyl phosphonium bromide, carbethoxymethyl triphenyl phosphonium bromide, methoxymethyl triphenyl phosphonium chloride, allyloxymethyl triphenyl phosphonium chloride, allyl triphenyl phosphonium chloride, and tetrabutyl phosphonium bromide.

Such phosphonium compounds have the formula:

wherein P is phosphorous; $R_1$, $R_2$, $R_3$, and $R_4$ are selected individually from the group; $C_1$-$C_{20}$ alkyl, aryl, aralkyl, alkenyl, and the chlorine, fluorine, bromine, cyano, —OR, and —COOR substituted analogs thereof, R being selected from the group: $C_1$-$C_{20}$ alkyl, aryl, aralkyl, and alkenyl; and X is selected from the group: halide, sulfate, sulfite, bisulfate, bisulfite, carbonate, pentachlorothiophenolate, tetrafluoroborate, hexafluorosilicate, hexafluorophosphate, dimethyl phosphate, and $C_1$-$C_{20}$ alkyl-, aryl-, aralkyl-, and alkenyl-/-carboxylate and dicarboxylate: n is 1 or 2 and equal to the valence of the anion X, and are described and disclosed for this use in Pattison U.S. Pat. No. 3,876,654. In the above formula X can also be $^-$OAr or $^-$OArOH, where Ar is aryl radical, or the mono or di anion of a bisphenol.

The accelerator can also be a quaternary ammonium compound such as those disclosed in Kometani et al. U.S. Pat. No. 3,864,298 and Patel et al. U.S. Pat. No. 3,655,727 as well as a cyclic amidinium salts of the formula where n = 1 to 3

The composition of the invention also contains a metal compound composed of a divalent metal oxide, such as magnesium oxide, zinc oxide, calcium oxide, or lead oxide, or a divalent metal hydroxide; or a mixture of the oxide and/or hydroxide with a metal salt of a weak acid, for example a mixture containing about 1–70 percent by weight of the metal salt. Among the useful metal salts of weak acids are barium-, sodium-, potassium-, lead-, and calcium-/-stearate, -benzoate, -carbonate, -oxalate, and -phosphite. The amount of the metal compound added generally is about 0.5–20 parts by weight per 100 parts of fluoroelastomer, about 2–15 parts being preferred. The metal compound concentration to some extent affects the rate of cure, and below the preferred range the cure rate may sometimes be unduly decreased. Above the preferred range, the elas- tic properties of a cured fluoroelastomer are gradually impaired and it is, therefore, advantageous not to use too large amounts of the metal compound.

The metal compound serves a dual purpose. It scavenges certain gaseous and acidic materials which are evolved during vulcanization and can chemically attack and weaken the fluoroelastomer. It also provides a long term aging stability. When using a metal oxide, it can be compounded with a fluoroelastomer stock either free or as a metal oxide complex or chelate with organic complexing agents and ligands, such as cyclic polyethers, amines, phosphines, ketones, alcohols, phenols, or carboxylic acids.

The composition must also contain a press cure cross-linking agent, namely a bisphenol such as 4,4'-hexafluoro isopropylidene diphenol, 4,4'-isopropylidene diphenol, and 4,4'-dihydroxy diphenyl sulfone, or an ammonium or phosphonium salt (phenolate) thereof or a polyhydroxy phenol of the formula:

where R' is H or alkyl or aryl, or the formula:

Such bisphenols have the formula:

where B is a stable divalent radical. The ammonium or phosphonium salts may be one of the accelerators listed above.

Finally the composition of the invention must also contain a post cure cross-linking agent having the formula where A is a divalent radical selected from the group consisting of

-continued and x is zero or 1, but if x is zero then y is not zero; E is selected from the group consisting of F, Cl, Br, I, —$CF_3$, —$NO_2$, and —CN; D is selected from the class consisting of R' and E; R is alkylene, or arylene; R' alkyl, aryl or H; and y is zero, 1, 2, 3 or 4, and z is zero, 1, 2, 3, or 4 but the total of y and z for each benzene ring shown in the formula is 4. Usually the molecular weight of the post cure crosslinking agent will be less than about 1000. Particularly preferred compounds are those in which A is and the amine groups are in the 4,4' positions, or those in which A is and the amine groups are in the 4,4' positions. Compounds of the above formula where the amine group is a secondary alkyl substituted amine are also contemplated as useful in this invention.

The components of the composition of the invention are usually employed in about the following amounts, for each 100 parts by weight of the fluoroelastomer, about 0.1 to 3 parts by weight of the vulcanization accelerator, about 1 to 20 parts by weight of the metal compound, about 0.5 to 5 parts by weight of the press-cure crosslinking agent, and about 0.2 to 6 parts by weight of the postcure crosslinking agent.

The process of the present invention comprises curing the above described composition in at least two curing steps. In the first step the composition is heated in a confining zone such as a mold, and partially cured. It is then removed from the confining zone and further cured by prolonged heating to a higher temperature. Preferably the heating in the confining zone is at a temperature between about 160° C. and 210° C., and preferably the temperature of the postcure is above about 220° C. In order that the polymer is sufficiently cured that it will hold its shape after removal from the confining zone it is necessary that it be cured (press cured) to the extent that its elongation at break is not more than about 500%. During postcuring it is necessary, in order to obtain the full advantage of the invention, that the cure be such that the value of the press-cured elongation at break divided by the postcured elongation at break be at least about 1.5

The initial cure of the curable fluoroelastomer composition is preferably carried out by heating the composition in a confining zone for about 30 seconds to 60 minutes at about 160° to 210° C. Conventional rubber curing presses, molds, extruders and the like provided with suitable heating and curing means can be used. The final cure of the curable fluoroelastomer composition is carried out by heating the initially cured composition for about 4–48 hours at about 220°–275° C. for example in a circulating air oven.

By using the present composition and process, one can overcome problems associated with low elongation at break after the initial (press) cure when it is desired to achieve a high final (postcured) cure state that has a low elongation at break. Specifically, one of the advantages of the present invention is that it allows the production of articles that in the press-cured state have high elongations, and in the postcured state have excellent compression set resistance and retention of properties on heat aging. An advantage of a high press-cured elongation is that it allows a complex part to be demolded without tearing damage because the part can undergo sufficient elongation during removal from the confines of a mold whose shape requires that the mold part be stretched during removal, such as an undercut mold. Some advantages of a high final state of cure compared to a lower cure state are that the high cure state generally provides better physical properties such as 100% modulus, tensile strength, and compression set resistance and retains these properties better on heat aging. The present compositions and process therefore offer greatly improved demolding performance and freedom in mold design without compromising the postcured physical properties.

The present composition and process can also be used advantageously to cure a fluoroelastomer part to a normal initial state of cure and then to allow the final cure state to rise to a much higher than normal level during the postcure cycle. In this practice of the present invention it is possible to combine normal demolding behavior with higher than normal physical properties after the postcure and therefore to be able to manufacture a cured fluoroelastomer article whose otherwise desirably high final cure state would not allow the article to be removed from an undercut mold without damage to the article. The advantage of a high final cure state as may be required for optimum performance can therefore be realized for complex molded parts.

In the drawing, FIG. 1, the lines are oscillating the disk rheometer tracings of polymer compounds as they are being cured. Time is the horizontal axis and inch pounds of torque the vertical axis.

In the following examples, all parts are by weight unless otherwise specified.

EXAMPLE 1

A preferred fluoroelastomer composition of the present invention is prepared, cured and tested. The composition is prepared by blending the following on a 2-roll rubber mill whose rolls are at about 25° C.: 100 parts fluoroelastomer, 30 parts carbon black, 6 parts calcium hydroxide, 3 parts magnesium oxide, 1.0 parts benzyltriphenyl phosphonium chloride, 1.3 parts 4,4'-hexafluoroisopropylidene diphenol, and 2.0 parts of 4-aminophenyl sulfone. The fluoroelastomer is a vinylidene fluoride/hexafluoropropylene/tetrafluoroethylene (45:30:25 weight %) terpolymer whose Mooney viscosity (ML-10 at 121° C.) is 75.

Test results are shown in Table 1. Samples of the freshly prepared uncured compositions are used for measuring the curing characteristics with the oscillating disc cure meter according to ASTM Method D-2084. The table shows the cure state achieved in 30 minutes at 177° C. as $M_H$-$M_L$ in N.m, and the time in minutes required to reach 50% of the cure state that is reached in 30 minutes at 177° C. as $t_c50$.

In preparing the cured samples, the compression set pellets and tensile slabs are press cured for 30 minutes at 177° C. at a total force of about 4MN per m² of mold area.

The press cured samples are postcured for 24 hours at 232° C. in a circulating air oven. After postcuring the samples are subjected to heat aging by exposure to circulating air for 7 days at 275° C. in an oven. The modulus, tensile strength and elongation values for the press-cured, postcured, or heat-aged samples are obtained at room temperature by ASTM Method D-412. Compression set values are obtained by ASTM Method D-395-61.

The fluoroelastomer composition of Example 1 is very useful for the rapid manufacture of cured fluoroelastomer articles that have excellent physical properties after postcuring and that can easily be removed from a complex mold because of the high press-cured elongation of the molded article. The composition of Example 1 is most advantageously used for the manufacture of various kinds of seals, especially shaft seals, and can also be used for heat- and solvent-resistant and resilient o-rings, gaskets, tubing, and the like.

EXAMPLE 2 (Comparative Example)

For purposes of comparison, a fluoroelastomer composition outside the present invention is prepared, cured, and tested in the manner described in Example 1, except that the 4-aminophenyl sulfone used in Example 1 is omitted from the composition and that the level of 4,4'-hexafluoroisopropylidene diphenol used in Example 1 is raised from 1.3 to 2.0 parts.

Test results are shown in Table 1, where it can be seen that the press-cured elongation of Example 1 is over 100% higher than that of Example 2, and that on postcuring the elongation of Example 1 is even slightly lower than that of Example 2. These results indicate that the press-cured fluoroelastomer composition of Example 1 continues to cure during the postcure cycle to a much greater extent than the composition of Example 2, and that the postcured state of the composition of Example 1 is higher than that of Example 2. The improved compression set resistance of the postcured pellets of the composition of Example 1 compared to Example 2 also indicates that the cure state of the postcured pellet of Example 1 is at least as stable as that of Example 2. Furthermore, the modulus values and tensile strength of the press-cured composition of Example 1, which are lower than those of the press-cured composition of Example 2, increase sharply during postcure and actually surpass the corresponding values of the postcured composition of Example 2. The test results of Table 1 also show that the heat-aged tensile properties of the composition of Example 1 exceed those of Example 2. Thus, the comparison of the test results between Examples 1 and 2 shows that the present invention as illustrated by Example 1 can successfully combine a low press-cured cure state for improved demoldability with a high postcured cure state for excellent or even improved performance compared to the prior art as illustrated by Example 2.

EXAMPLE 3

Another curable fluoroelastomer composition of the present invention is prepared, cured, and tested in the manner described in Example 1, except that the level of 4,4'-hexafluoroisopropylidene diphenol used in Example 1 is reduced from 1.3 to 0.95 parts.

Test results are shown in Table 1, where it can be seen that the press-cured elongation of Example 3 is even higher than that of Example 1 but that the postcured elongations of Examples 1 and 3 are identical. Therefore in Example 3 the advantage in press-cured elongation over that of Example 2 is even greater than that of Example 1. The compression set of postcured pellets in Example 3 is somewhat higher than that of Example 1 because a lower cure state exists in postcured pellets of Example 3 than in postcured pellets of Example 1, as is evident from a comparison of the modulus values of postcured samples of Examples 1 and 3. However, the compression set of postcured pellets of Example 3 is almost identical to that of postcured pellets of Example 2, and therefore the curable fluoroelastomer composition of Example 3 would be much preferred over that of Example 2 because of the much higher press-cured elongation and consequently superior demoldability of presscured articles made from the composition of Example 3. The $t_c50$ value of the composition of Example 3 is only less than one minute greater than that of Example 2 and the composition is therefore considered to be rapidly curable.

EXAMPLE 4 (Comparative Example)

For purposes of comparison, a fluoroelastomer composition outside the present invention is prepared, cured, and tested in the manner described in Example 1, except that the 4,4'-hexafluoroisopropylidene diphenol used in Example 1 is omitted from the composition.

Test results are shown in Table 1, where it can be seen that the press-cured samples are severely undercured. This is evident from both the oscillating disc cure meter results, which shows that compared to Example 2 the degree of cure of Example 4 is only one third of that of Example 2 and less than one half of that of Examples 1 or 3, and from the comparison of modulus and tensile strength values of press-cured samples of Examples 1-4.

Although postcuring greatly increases the tensile strength of the press-cured composition of Example 4, the postcured samples of Example 4 are still undercured and postcured pellets of Example 4 are in fact unfit for compression set testing because of the void formation and fracture that occurs during the press-cure and postcure cycles.

Heat-aged tensile properties of Example 4 are also much inferior to those of Examples 1-3.

It can be concluded, therefore, that 4-aminophenyl sulfone used without an aromatic hydroxy compound is too inactive a crosslinking agent to be used practically, as can also be seen from its very large $t_c50$ value.

EXAMPLES 5 AND 6

Another curable fluoroelastomer composition of the present invention is prepared, cured, and tested in the manner described in Example 1, except that the 30 parts carbon black used in Example 1 are omitted from the composition of Example 5 and that the 1.3 parts of 4,4'-hexafluoroisopropylene diphenol used in Example 1 is raised to 1.9 parts in Example 5.

For purposes of comparison, a curable fluoroelastomer composition outside the present invention is prepared, cured, and tested in the manner described in Example 1, except that the 30 parts carbon black and 2.0 parts 4-aminophenyl sulfone used in Example 1 are omitted from the composition of Example 6 and that the 1.3 parts of 4,4'-hexafluoroisopropylidene diphenol used in Example 1 is raised to 1.9 parts in Example 6.

Test results are shown in Table 2, where it can be seen that the press-cured composition of Example 5 has a higher elongation than that of Example 6, and that the postcured composition of Example 5 has a lower elongation that that of Example 6. Therefore the composition of Example 5 is greatly preferred over that of Example 6 when an elastomeric composition must be cured in an undercut mold and, after postcure, is used in an application that requires a high cure state.

EXAMPLES 7 AND 8

Another curable fluoroelastomer composition of the present invention is prepared, cured, and tested in the manner described in Example 1, except that in Example 7 (a) the level of benzyl triphenyl phosphonium chloride used in Example 1 is raised from 1.0 to 1.2 parts, (b) the level of 4,4'-hexafluoroisopropylidene diphenol used in Example 1 is raised from 1.3 to 3.0 parts, (c) the fluoroelastomer used in Example 1 is replaced by an equal amount of a vinylidene fluoride/hexafluoropropylene/tetrafluoroethylene/4-bromo-3,3,4,4-tetrafluoro-butene-1 (35/34/29/2 weight percent) polymer whose Mooney Viscosity (ML-10, 121° C.) is 60, and (d) the press cure time of 30 minutes used in Example 1 is shortened to 15 minutes.

For purposes of comparison, a curable fluoroelastomer composition outside the present invention is prepared, cured, and tested as in Example 7, except that in Example 8 the 2.0 parts of 4-aminophenyl sulfone used in Example 8 is omitted.

Test results are shown in Table 2, where it can be seen that the press-cured composition of Example 7 has a much higher elongation that that of Example 8, and that the postcured composition of Example 7 has a much lower elongation that that of Example 8. The composition of Example 7 would therefore be greatly preferred over that of Example 8 for the same reasons that the composition of Example 5 is preferred over that of Example 6.

EXAMPLES 9 AND 10

Another curable fluoroelastomer composition of the present invention is prepared, cured, and tested in the manner described in Example 1, except that in Example 9 (a) the level of benzyltriphenyl phosphonium chloride used in Example 1 is reduced from 1.0 to 0.50 parts, (b) the level of 4,4'-hexafluoroisopropylidene diphenol used in Example 1 is reduced from 1.3 to 1.0 parts, and (c) the fluoroelastomer used in Example 1 is replaced by a vinylidene fluoride/hexafluoropropylene (60/40 weight percent) polymer whose Mooney Viscosity (ML-10, 100° C.) is 60.

For purposes of comparison, a curable fluoroelastomer composition outside the present invention is prepared, cured, and tested as in Example 9, except that in Example 10 the 2.0 parts of 4-aminophenyl sulfone used in Example 9 is omitted.

Test results are shown in Table 2, where it can be seen that the press-cured composition of Example 9 has a much higher elongation that that of Example 10 and that the postcured compositions of Examples 9 and 10 have similar elongations. The press-cured composition of Example 9 therefore increases its cure state to a much greater degree during the postcure than does the press-cured composition of Example 10. The composition of Example 9 is therefore much more useful than that of Example 10 for the manufacture of articles in a highly undercut mold.

EXAMPLE 11

To illustrate that aromatic amino compounds other than 4-aminophenyl sulfone can be used to practice the present invention, Run 3 of Table 3 shows the results of tests where the aromatic amino compound is 4,4'-hexafluoroisopropylidene dianiline. Run 2 shows that when the same level of 4,4'-hexafluoroisopropylidene diphenol is used as in Run 3 but when no aromatic amino compound is present, a high press-cured elongation results and postcuring greatly decreases the elongation; however, the postcured cure state of Run 2 remains low in comparison to Run 3 as is evident from a comparison of 100% modulus values. Furthermore, the heat-aged properties of Run 2 are much inferior to those of Run 3. Therefore, although the ratio of press-cured elongation to postcured elongation of Run 2 is 1.64, the composition of Run 2 is undercured even after postcure and remains undercured when heat aged.

EXAMPLE 12

Table 4 illustrates results obtained using 4,4'-hexafluoroisopropylidene diphenol alone, and in combination with 4-aminophenyl sulfone or in combination with 1,3-propanediol bis(4-amino-benzoate), and Runs 4, 5, and 6 show comparative results obtained with compositions of the invention, which have somewhat slower cure rates.

EXAMPLE 13

Run 2 of Table 5 shows that the present invention can also be practiced using 4,4'-isopropylidene diphenol with an aromatic diamine.

EXAMPLE 14

Run 2 of Table 6 illustrates that the present invention can also be practiced by using a salt of an aromatic hydroxy compound in conjunction with an aromatic amino compound.

EXAMPLE 15

Run 2 of Table 7 illustrates that the present invention can also be practiced by using a quaternary ammonium salt, instead of a quaternary phosphonium salt, in conjunction with a bisphenol and an aromatic diamine. Thus, a rapid and stable cure is obtained by using methyltricapryl ammonium chloride with 4,4'-hexafluoroisopropylidene diphenol and 4-aminophenyl sulfone, and compared to the composition of Run 1, which is outside the present invention, the composition of Run 2 has a 33% greater ratio of press-cured elongation to postcured elongation and therefore possesses a significant demolding advantage.

TABLE 1

| | Examples | | | |
|---|---|---|---|---|
| | 1 | 2* | 3 | 4* |
| Cure State at 177°/30' ASTM D-2084 | | | | |
| $M_H - M_L$, N·m | 4.2 | 5.1 | 3.6 | 1.7 |
| $t_c 50$, min. | 6.1 | 4.2 | 5.0 | 12.7 |
| Test Results | | | | |
| Press Cured Samples | | | | |
| Modulus - 100% MPa | 3.9 | 4.6 | 3.3 | 2.6 |
| Modulus - 200% MPa | 7.3 | 9.1 | 5.9 | 3.8 |
| Tensile Strength MPa | 11.5 | 12.6 | 10.6 | 3.7 |
| Elongation at break % | 395 | 290 | 455 | 950 |
| Postcured Samples | | | | |
| Modulus - 100% MPa | 7.2 | 6.5 | 6.3 | 3.7 |
| Modulus - 200% MPa | 18.1 | 15.0 | 15.5 | 8.9 |
| Tensile Strength MPa | 18.1 | 16.0 | 15.7 | 14.4 |
| Elongation at break % | 200 | 210 | 200 | 305 |
| Compression Set B, pellets, 70 h/204° C. | 37 | 41 | 42 | untestable |
| Quotient: $\frac{\text{press cured elongation at break}}{\text{postcured elongation at break}}$ | 1.98 | 1.38 | 2.28 | 3.11 |
| Heat Aged Samples | | | | |
| Modulus - 100% MPa | 4.4 | 3.7 | 4.1 | 2.9 |
| Modulus - 200% MPa | 8.8 | 7.4 | 7.6 | 4.3 |
| Tensile Strength MPa | 10.8 | 10.0 | 10.0 | 6.0 |
| Elongation at break % | 280 | 310 | 320 | 565 |

*comparative examples

TABLE 2

| | Examples | | | | | |
|---|---|---|---|---|---|---|
| | 5 | 6* | 7 | 8* | 9 | 10* |
| Cure State at 177°/30' ASTM D-2084 | | | | | | |
| $M_H - M_L$, N·m | 3.1 | 2.7 | — | — | 3.8 | 5.2 |
| Test Results | | | | | | |
| Press Cured Samples | | | | | | |
| Modulus - 100% MPa | 1.7 | 1.5 | 5.9 | 6.8 | 3.6 | 5.4 |
| Modulus - 200% MPa | 4.0 | 3.9 | 8.8 | — | 6.2 | 11.0 |
| Tensile Strength MPa | 11.7 | 10.1 | 10.3 | 10.1 | 9.9 | 11.4 |
| Elongation at break % | 365 | 320 | 255 | 165 | 370 | 200 |
| Postcured Samples | | | | | | |
| Modulus - 100% MPa | 2.7 | 1.7 | 11.7 | 9.2 | 7.1 | 8.0 |
| Modulus - 200% MPa | 11.0 | 6.5 | — | — | — | — |
| Tensile Strength MPa | 12.3 | 12.9 | 13.7 | 15.1 | 15.1 | 12.7 |
| Elongation at break % | 205 | 270 | 105 | 140 | 180 | 140 |
| Compression Set B, % 70 h/204°, pellets | — | — | — | — | 23 | 16 |
| Quotient: $\frac{\text{press cured elongation at break}}{\text{postcured elongation at break}}$ | 1.78 | 1.19 | 2.43 | 1.18 | 2.06 | 1.43 |

*Comparative examples

TABLE 3

| | Example 11 | | |
|---|---|---|---|
| | Run 1* | Run 2* | Run 3 |
| Elastomer, $CH_2=CF_2/CF_2=CFCF_3/CF_2=CF_2$ (Wt %, 45/30/25) | 100 | 100 | 100 |
| Carbon black | 30 | 30 | 30 |
| Calcium hydroxide | 6 | 6 | 6 |
| Magnesium oxide | 3 | 3 | 3 |
| Benzyltriphenylphosphonium chloride | 1.0 | 1.0 | 1.0 |
| 4,4'-hexafluoroisopropylidene diphenol | 1.9 | 0.95 | 0.95 |
| 4,4'-hexafluoroisopropylidene dianiline | — | — | 2.7 |
| Cure State at 177° C./30', ASTM D-2084 | | | |
| $M_H - M_L$, N·m | 5.1 | 2.5 | 4.5 |
| Press Cured Samples, (177° C./30') | | | |
| Modulus - 100%, MPa | 4.5 | 3.8 | 4.6 |
| Modulus - 200%, MPa | 8.5 | 6.4 | 7.9 |
| Tensile Strength, MPa | 11.2 | 8.7 | 10.9 |
| Elongation at break, % | 300 | 385 | 330 |
| Quotient: $\frac{\text{press cured elongation at break}}{\text{postcured elongation at break}}$ | 1.36 | 1.64 | 1.94 |
| Post Cured Samples, (232° C./24 h) | | | |
| Modulus - 100%, MPa | 6.1 | 5.3 | 9.1 |
| Modulus - 200%, MPa | 12.8 | 11.0 | — |
| Tensile Strength, MPa | 14.3 | 12.8 | 17.0 |
| Elongation at break, % | 220 | 235 | 170 |
| Heat Aged Samples, (275° C./7 d) | | | |
| Modulus - 100%, MPa | 3.9 | 3.1 | 7.4 |
| Modulus - 200%, MPa | 7.2 | 4.6 | 12.6 |
| Tensile Strength, MPa | 9.6 | 5.7 | 12.6 |
| Elongation at break, % | 295 | 520 | 200 |

*comparative run

TABLE 4

| | Example 12 | | |
|---|---|---|---|
| | Run 1* | Run 2 | Run 3 |
| Elastomer, $CH_2=CF_2/CF_2=CFCF_3/CF_2=CF_2$ (Wt %, 45/30/25) | 100 | 100 | 100 |
| Carbon black | 30 | 30 | 30 |
| Calcium hydroxide | 6 | 6 | 6 |
| Magnesium oxide | 3 | 3 | 3 |
| Benzyltriphenylphosphonium chloride | 0.90 | 0.95 | 0.95 |
| 4,4'-hexafluoroisopropylidene diphenol | 1.90 | 1.15 | 1.15 |
| 4-aminophenyl sulfone | — | 2.0 | — |
| 1,3-propane diol bis (4-aminobenzoate) | — | — | 2.5 |
| hydroquinone | — | — | — |
| resorcinol | — | — | — |
| 2,4-dihydroxybenzophenone | — | — | — |
| Cure State at 177° C./30', ASTM D-2084 | | | |
| $M_H - M_L$, N·m | 4.5 | 3.7 | 4.0 |
| $t_c 50$, min | 4.2 | 4.3 | 4.4 |
| Press Cured Samples, (177° C./15') | | | |
| Modulus - 100%, MPa | 5.3 | 4.2 | 3.8 |
| Modulus - 200%, MPa | 10.1 | 7.7 | 6.3 |
| Tensile Strength, MPa | 12.3 | 11.8 | 9.8 |
| Elongation at break, % | 265 | 365 | 360 |
| Postcured Samples, (232° C./24 h) | | | |
| Modulus - 100%, MPa | 7.4 | 8.4 | 10.0 |
| Tensile Strength, MPa | 15.2 | 17.3 | 17.5 |
| Elongation at break, % | 195 | 165 | 150 |
| Quotient: $\frac{\text{press cured elongation at break}}{\text{postcured elongation at break}}$ | 1.36 | 2.21 | 2.40 |
| Heat Aged Samples, (275° C./7 d) | | | |
| Modulus - 100%, MPa | 4.3 | 5.3 | 5.7 |
| Modulus - 200%, MPa | 10.3 | 11.2 | 10.7 |
| Tensile Strength, MPa | 11.7 | 12.1 | 10.7 |
| Elongation at break, % | 230 | 215 | 200 |

| | Example 12 | | |
|---|---|---|---|
| | Run 4 | Run 5 | Run 6 |
| Elastomer, $CH_2=CF_2/CF_2=CFCF_3/CF_2=CF_2$ | 100 | 100 | 100 |

TABLE 4-continued

| (Wt %, 45/30/25) | | | |
|---|---|---|---|
| Carbon black | 30 | 30 | 30 |
| Calcium hydroxide | 6 | 6 | 6 |
| Magnesium oxide | 3 | 3 | 3 |
| Benzyltriphenylphosphonium chloride | 0.95 | 0.70 | 0.70 |
| 4,4'-hexafluoroisopropylidene-diphenol | — | — | — |
| 4-aminophenyl sulfone | 2.0 | 2.0 | 2.0 |
| 1,3-propane diol bis (4-aminobenzoate) | — | — | — |
| hydroquinone | 0.67 | — | — |
| resorcinol | — | 0.60 | — |
| 2,4-dihydroxybenzophenone | — | — | 1.2 |
| Cure State at 177° C./30', ASTM D-2084 | | | |
| $M_H - M_L$, N·m | 3.2 | 4.1 | 2.1 |
| $t_c50$, min | 9.8 | 7.3 | 11.8 |
| Press Cured Samples, (177° C./15') | | | |
| Modulus - 100%, MPa | 4.1 | 3.4 | 3.0 |
| Modulus - 200%, MPa | 7.2 | 5.5 | 4.5 |
| Tensile Strength, MPa | 10.8 | 7.3 | 6.1 |
| Elongation at break, % | 360 | 555 | 690 |
| Postcured Samples, (232° C./24 h) | | | |
| Modulus - 100%, MPa | 8.4 | 5.9 | 5.3 |
| Tensile Strength, MPa | 15.7 | 12.4 | 13.8 |
| Elongation at break, % | 170 | 175 | 185 |
| Quotient: | | | |
| $\frac{\text{press cured elongation at break}}{\text{postcured elongation at break}}$ | 2.12 | 3.17 | 3.7 |
| Heat Aged Samples, (275° C./7 d) | | | |
| Modulus - 100%, MPa | 4.1 | 3.4 | 3.4 |
| Modulus - 200%, MPa | 8.0 | 5.3 | 6.2 |
| Tensile Strength, MPa | 10.0 | 6.6 | 8.3 |
| Elongation at break, % | 280 | 310 | 315 |

*comparative example

TABLE 5

| | Example 13 | |
|---|---|---|
| | Run 1 (Control) | Run 2 |
| Elastomer, $CH_2=CF_2/CF_2=CFCF_3/CF_2=CF_2$ (Wt %, 45/30/25) | 100 | 100 |
| Carbon black | 30 | 30 |
| Calcium hydroxide | 6 | 6 |
| Magnesium oxide | 3 | 3 |
| Benzyltriphenylphosphonium chloride | 0.90 | 1.30 |
| 4,4'-hexafluoroisopropylidenediphenol | 2.0 | — |
| 1,3-propane diol bis(4-aminobenzoate) | — | 2.5 |
| 4,4'-isopropylidene diphenol | — | 1.8 |
| Cure State at 177° C./24', ASTM D-2084 | | |
| $M_H - M_L$, N·m | 4.5 | 3.3 |
| Press Cured Samples, (177° C./15') | | |
| Modulus - 100%, MPa | 5.1 | 3.2 |
| Modulus - 200%, MPa | 8.4 | 4.5 |
| Tensile Strength, MPa | 9.8 | 6.3 |
| Elongation at break, % | 275 | 505 |
| Postcured Samples, (232° C./24 h) | | |
| Modulus - 100%, MPa | 6.8 | 9.5 |
| Tensile Strength, MPa | 12.6 | 11.3 |
| Elongation at break, MPa | 195 | 130 |
| Quotient: | | |
| $\frac{\text{Press cured elongation at break}}{\text{Postcured elongation at break}}$ | 1.41 | 3.88 |

TABLE 6

| | Example 14 | |
|---|---|---|
| | Run 1* | Run 2 |
| Elastomer, $CH_2=CF_2/CF_2=CFCF_3/CF_2=CF_2$ (Wt %, 45/30/25) | 100 | 100 |
| Carbon black | 30 | 30 |
| Calcium hydroxide | 6 | 6 |
| Magnesium oxide | 3 | 3 |
| Benzyltriphenylphosphonium chloride | 0.9 | — |
| 4,4'-hexafluoroisopropylidene diphenol | 2.0 | 0.4 |
| 4-chlorophenyl sulfone | 1.0 | 1.6 |
| 4-aminophenyl sulfone | — | 2.0 |
| $\phi_3P^{\oplus}{}^{\ominus}O-\text{\Large\textlangle}-\overset{CF_3}{\underset{CF_3}{C}}-\text{\Large\textlangle}-OH$ $\underset{\phi}{\overset{|}{CH_2}}$ | — | 1.7 |
| Cure State at 177° C./24', ASTM D-2084 | | |
| $M_H - M_L$, N·m | 4.9 | 4.0 |
| Cure rate | | |
| $t_c50$, min | 3.2 | 3.4 |
| Press Cured Samples, (177° C./15') | | |
| Modulus - 100%, MPa | 4.6 | 3.8 |
| Modulus - 200%, MPa | 8.6 | 6.6 |
| Tensile Strength, MPa | 10.5 | 9.7 |
| Elongation at break, % | 265 | 370 |
| Postcured Samples, (232° C./24 h) | | |
| Modulus - 100%, MPa | 7.1 | 8.1 |
| Tensile Strength, MPa | 14.7 | 15.2 |
| Elongation at break | 185 | 165 |
| Compression Set B, % (70 h/204° C., pellets) | 47 | 44 |
| Quotient: | | |
| $\frac{\text{press-cured elongation at break}}{\text{postcured elongation at break}}$ | 1.43 | 2.24 |

*comparative example

TABLE 7

| | Example 15 | |
|---|---|---|
| | Run 1* | Run 2 |
| Elastomer, $CH_2=CF_2/CF_2=CFCF_3/CF_2=CF_2$ (Wt %, 45/30/25) | 100 | 100 |
| Carbon black | 30 | 30 |
| Calcium hydroxide | 6 | 6 |
| Magnesium oxide | 3 | 3 |
| Benzyltriphenylphosphonium chloride | 0.9 | — |
| Methyltricapryl ammonium chloride | — | 1.2 |
| 4,4'-hexafluoroisopropylidene diphenol | 2.0 | 1.2 |
| 4-aminophenyl sulfone | — | 2.0 |
| Cure State at 177° C./24', ASTM D-2084 | | |
| $M_H - M_L$, N·m | 5.2 | 4.4 |
| $t_c50$, min. | 3.9 | 2.0 |
| Press Cured Samples, (177° C./15') | | |
| Modulus - 100%, MPa | 5.0 | 3.8 |
| Modulus - 200%, MPa | 9.6 | 6.6 |
| Tensile Strength, MPa | 11.4 | 9.2 |
| Elongation at break, % | 250 | 315 |
| Postcured Samples, (232° C./24 h) | | |
| Modulus - 100%, MPa | 7.6 | 7.9 |
| Tensile Strength, MPa | 15.3 | 15.0 |
| Elongation at break, % | 185 | 175 |
| Compression Set B, % (70 h/204° C., pellets) | 47 | 48 |
| Quotient: | | |
| $\frac{\text{press cured elongation at break}}{\text{postcured elongation at break}}$ | 1.35 | 1.80 |

*comparative run

EXAMPLE 16

In Table 8 below are shown the formulations and results obtained on curing 5 different mixtures of the same fluoropolymer with different curing systems. The fluoropolymer mixtures contained 100 parts by weight polymer, i.e., vinylidene fluoride/hexafluoropropylene/tetrafluoroethylene (45:30:25 weight %) having a Mooney viscosity of 75 (ML-10 at 121° C.), contained 30 parts by weight carbon black, 6 parts by weight calcium hydroxide, 3 parts by weight magnesium oxide and 0.9 part benzyltriphenyl phosphonium chloride, and the curing agents listed in Table 8 in the amounts shown in Table 8. The mixtures labeled A and B are control examples. The mixture C is a composition of the invention. Mixtures D and E contain amine curing agents known in the prior art—see Patel U.S. Pat. No. 3,655,727 Table K items 2 and 3.

Figure 1:
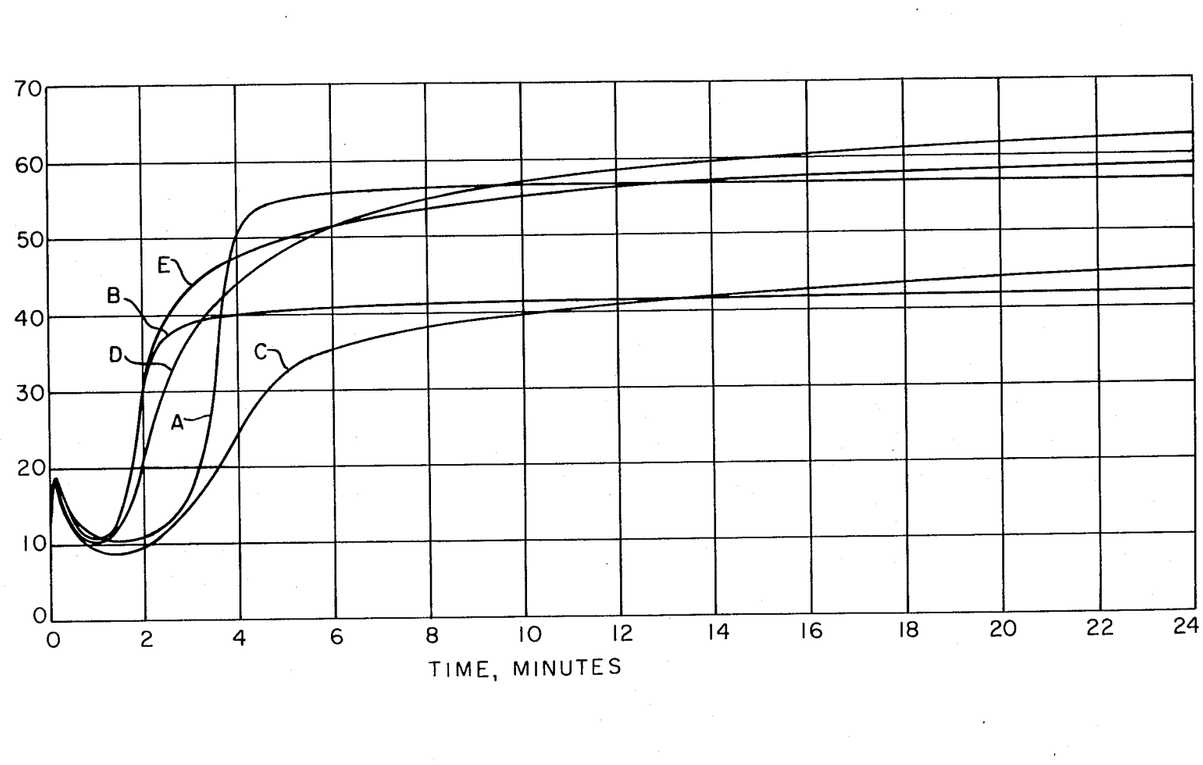

The Figure shows are oscillating disk rheometer tracings obtained on testing the mixtures A through E at 177° C. for 24 minutes in accordance with ASTM D-2084. Tracing C, shows a relatively gradual inclination and a low cure state, indicating that the elastomer is curing in a gradual manner and possesses a high elongation—this indication is further evidenced by the data shown in Table 8 where it is shown that when Composition C is press cured for 10 minutes at 177° C. it has an elongation at break, $E_B$, of 390%. Because of the gradual curing of Composition C, it is possible to remove press cured articles of Composition C from a mold of a complex shape, i.e., one in which the molded article must be stretched and/or distorted, during a much longer period of the curing cycle than the other compositions. As can be seen from a comparison of the ODR curves, a further advantage of Composition C over Compositions D and E is that its processing safety is similar to that of Compound A, which is a standard compound recognized for its excellent resistance to premature curing, whereas Compounds D and E can be seen to cure prematurely and thus exhibit inferior mold flow. Furthermore after post-curing, Composition C possessed sufficient elongation at break, 180%, to be considered a top quality elastomer, and at the same time had a higher tensile strength than the other compositions.

Composition C also exhibited better resistance to high temperature compression set than any other sample. FIG. 1 and the data in Table 8 shows that Composition C can be efficiently and effectively step cured.

TABLE 8

| | Composition | | | | |
|---|---|---|---|---|---|
| | A* | B* | C | D* | E* |
| Curing Agent | | | | | |
| (1) 4,4' hexafluoroisopropylidene diphenol | 2.0 | 1.2 | 1.2 | 1.2 | 1.2 |
| (2) p-aminophenylsulfone | 0 | 0 | 2.0 | 0 | 0 |
| (3) p-aminophenylether | 0 | 0 | 0 | 1.61 | 0 |
| (4) m-phenylene diamine | 0 | 0 | 0 | 0 | 0.87 |
| Press cured 10 min. at 177° C. | | | | | |
| $M_{100}$ psi | 800 | 500 | 570 | 820 | 780 |
| $M_{200}$ psi | 1500 | 1000 | 1000 | 1550 | 1450 |
| $T_B$ psi | 1780 | 1610 | 1560 | 1880 | 1850 |
| $E_B$ % | 250 | 360 | 390 | 270 | 290 |
| Postcured 24 hrs. at 232° C. | | | | | |
| $M_{100}$ psi | 1100 | 780 | 1140 | 1800 | 1460 |
| $M_{200}$ psi | — | 1900 | — | — | — |
| $T_B$ psi | 2290 | 2260 | 2500 | 2440 | 2340 |
| $E_B$ % | 180 | 235 | 180 | 120 | 150 |
| Heat Aged (seven days at 275° C.) | | | | | |
| $M_{100}$ psi | 730 | 480 | 800 | 1380 | 1050 |
| $M_{200}$ psi | 1560 | 920 | 1610 | — | 1930 |
| $T_B$ psi | 1750 | 1350 | 1910 | 1820 | 1980 |
| $E_B$ % | 225 | 355 | 260 | 135 | 205 |
| Compression set (o-rings 0.139") at 204° C. for 70 hours | | | | | |
| % | 31 | 47 | 29 | 32 | 34 |

*comparative example

I claim:

1. A fluoroelastomer composition comprising:

A. An elastomeric copolymer of vinylidene fluoride and at least one other fluorinated monomer,

B. a vulcanization accelerator selected from the class consisting of quaternary phosphonium compounds and quaternary ammonium compounds, C. a metal compound selected from the group consisting of divalent metal oxides, divalent metal hydroxides, and mixtures of such oxides or hydroxides with metal salts of weak acids, D. a press-cure crosslinking agent selected from the class consisting of a bisphenol or an ammonium or a phosphonium salt thereof or a polyhydroxy phenol of the formula:

where R' is H or akyl or aryl, or of the formula:

and

E. a postcure cross-linking agent having the formula:

where A is a divalent radical selected from the group consisting of

-continued and x is zero or 1, but if x is zero then y is not-zero; E is selected from the group consisting of F, Cl, Br, I, —CF$_3$, —NO$_2$, and —CN; D is selected from the class consisting of R′ and E; R is alkylene, or arylene; R′ is alkyl, aryl or H; and y is zero, 1, 2, 3 or 4; and z is zero, 1, 2, 3, or 4.

2. The composition of claim 1 in which the component E is a bisamine, A is and the amine groups are in the 4,4′-position.

3. The composition of claim 1 in which for each 100 parts by weight of component A there are about 0.1 to 3 parts by weight of component B, about 1 to 20 parts by weight of component C, about 0.5 to 6 parts by weight of component D, and about 0.2 to 6 parts by weight of component E.

4. The composition of claim 3 in which the fluoroelastomer is a terpolymer of vinylidene fluoride, hexafluoropropylene and tetrafluoroethylene, or a dipolymer of vinylidene fluoride and hexafluoropropylene.

5. The composition of claim 4 in which the vulcanization accelerator is benzyltriphenylphosphonium chloride.

6. The composition of claim 5 in which the postcure crosslinking agent has the formula:

7. The composition of claim 5 in which the postcure crosslinking agent has the formula:

8. The composition of claim 1 in which the presscure crosslinking agent is 4,4′-hexafluoroisopropylidene diphenol.

9. The composition of claim 4 in which the vulcanization accelerator is methyltricapryl ammonium chloride.

10. A process of curing the fluoroelastomer composition of claim 1 which comprises heating said composition in a confining zone for a time and at a first temperature such that the fluoroelastomer is partially cured to a level such that it has a press cure elongation at break of not greater than about 500% at room temperature, removing the partially cured fluoroelastomer from the confining zone, and then further curing said fluoroelastomer at a higher temperature than said first temperature.

11. The process of claim 10 in which the confining zone is a mold, the first temperature is between about 160° C. and about 210° C.

12. The process of claim 9 in which the further curing is carried out at a temperature above about 220° C.

13. The process of claim 10 in which the fluoroelastomer is a terpolymer of vinylidene fluoride, hexafluoropropylene and tetrafluoroethylene.

14. The process of claim 10 in which the fluoroelastomer is a copolymer of vinylidene fluoride and hexafluororopylene.

15. The process of claim 10 in which the fluoroelatomer is a tetrapolymer of vinylidene fluoride, hexafluoropropylene, tetrafluoroethylene, and 4-bromo-3,3,4,4-tetrafluoro-butene-1.

* * * * *